Nov. 7, 1939.  C. W. SCOTT  2,178,998
ENGINE COWLING
Filed April 12, 1938  2 Sheets-Sheet 1
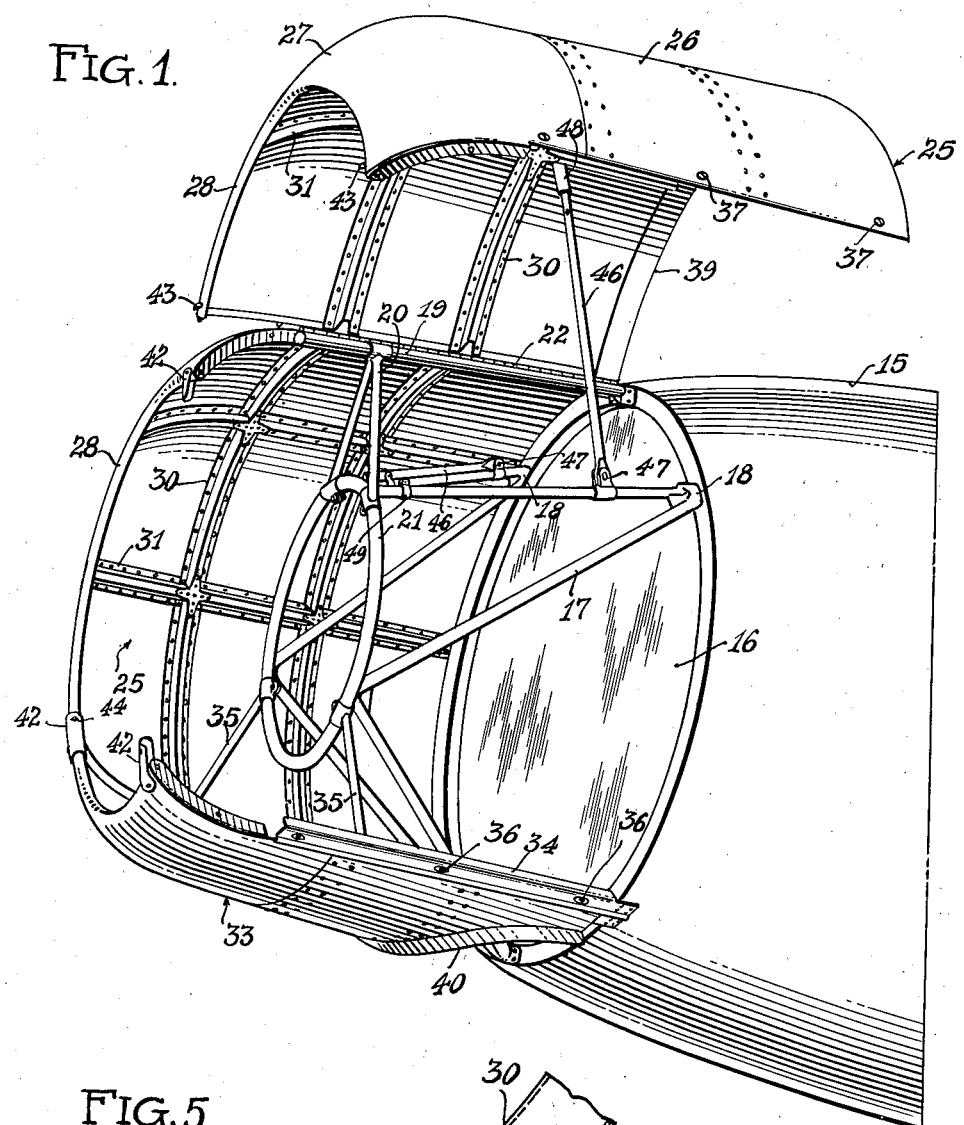
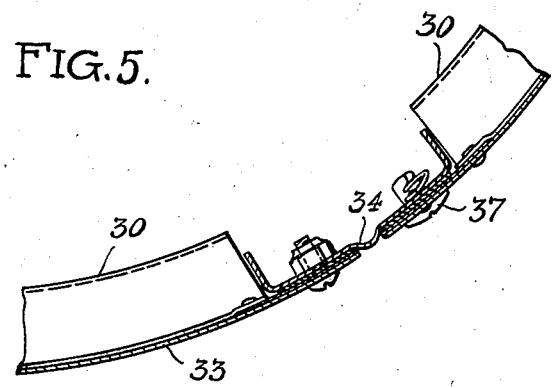
INVENTOR.
CARL W. SCOTT.
BY
ATTORNEYS.

Nov. 7, 1939.   C. W. SCOTT   2,178,998
ENGINE COWLING
Filed April 12, 1938   2 Sheets-Sheet 2
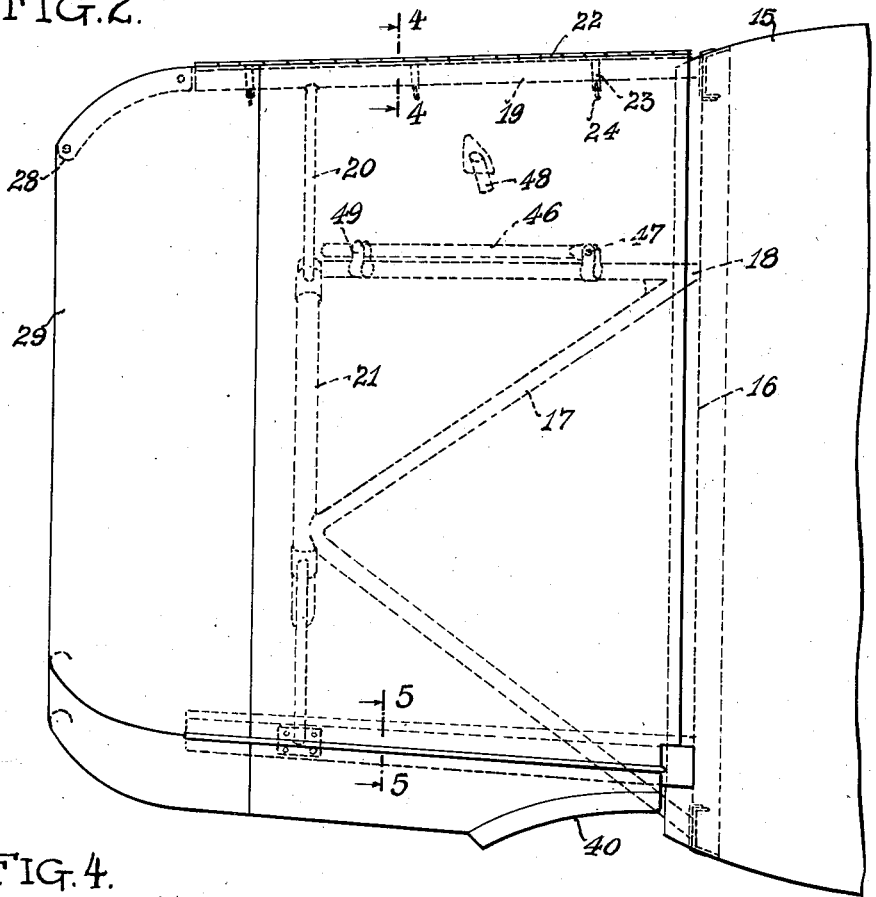
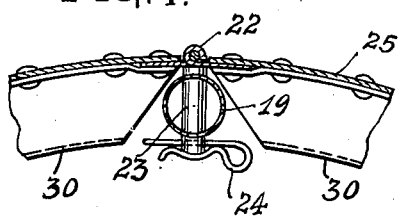
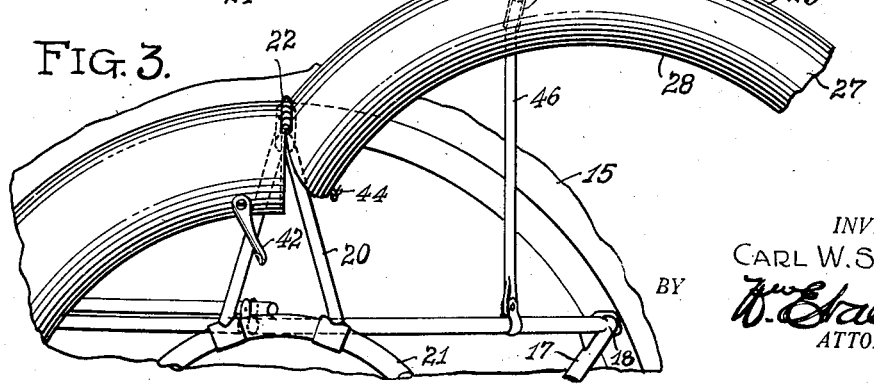
INVENTOR.
CARL W. SCOTT.
BY
ATTORNEYS.

Patented Nov. 7, 1939

2,178,998

UNITED STATES PATENT OFFICE 2,178,998

ENGINE COWLING

Carl William Scott, Ferguson, Mo., assignor to Curtiss-Wright Corporation, a corporation of Delaware Application April 12, 1938, Serial No. 201,483

9 Claims. (Cl. 244—53)

This invention relates to improvements in aircraft engine cowling and comprises generally a cowling assembly by which the power plant disposed therewithin may be made accessible for inspection and servicing with a minimum of difficulty insofar as removal of cowling parts is concerned. An object of the invention is to provide an annular cowling organization having an air exit slot so positioned as to preclude issuing air from blowing rearwardly into the aircraft cockpit, an associated object being to provide a cowling in which the air exit opening occupies only a small part of the cowling circumference whereby the air stream passing over the cowling is not disturbed by the issuing cooling air.

A further object is to provide a structural arrangement of cowling by which cowling portions may be readily removed or displaced from their operative position to enable inspection and servicing of the power plant therewithin, an associated object being to construct the cowl portions in a rigid manner so that their structural integrity is not upset when they are disposed for uncovering the power plant. A further object is to provide means by which the cowling sections, when displaced from operative relation with the power plant, may be easily maintained in a displaced position. In connection with the above, it will be realized that cowling for radial cylinder aircraft engines is quite bulky and difficult to handle so that the provisions of the invention allow of expeditious manipulation of the cowling with little possibility of damage thereto.

A further object of the invention is to provide means by which the continuity of the cowl leading edge is maintained when the cowling is in its operative position, despite the fact that it is made of several parts. The leading edge, which defines a cooling air entrance opening, is subject to considerable aerodynamic stress due to the action of the airflow thereon and it is essential that means be provided to prevent undue distortion of the leading edge shape.

For a more complete understanding of the invention, reference may be made to the subjoined detailed description in connection with the drawings in which:

Fig. 1 is a perspective elevation showing the cowling of this invention with a portion thereof raised to provide access to the power plant compartment;

Fig. 2 is a side elevation of the cowling in operative position;

Fig. 3 is a front elevation of a portion of the cowling assembly showing part of the cowling in raised position for access;

Fig. 4 is an enlarged section on the line 4—4 of Fig. 2, and

Fig. 5 is an enlarged section on the line 5—5 of Fig. 2.

I show an aircraft fuselage or nacelle 15 of any appropriate type having a forward wall 16 to the edges of which an engine mounting structure 17 is secured as at 18. From the topmost portion of the wall 16 a tube 19 projects forwardly and is supported at its forward end by a bipod 20 clamped to an engine mounting ring 21 secured in turn to the forward end of the mounting structure 17. The tube 19 provides an anchorage for a piano type hinge 22 having pins 23 passing through drillings in the tube 19 and retained from displacement by safety pins 24 passing through the pins at the bottom side of the tube 19. To the wings of the hinge 22, segments 25 of an annular cowling are attached, these segments comprising a main, substantially cylindrical skirt 26 which is co-extensive with the length of the hinge 22, and a forward inturned nose portion 27 defining at its leading edge 28 an air entrance opening 29. The segment 25 is provided with permanently attached circumferential and longitudinal channel bracing 30 and 31, respectively, which assures the inherent stiffness and rigidity of the cowling segment. As shown in Fig. 1, the near cowl segment 25 is raised upon the hinge 22 to provide access to the power plant compartment and to an engine which, although not shown, would be mounted upon the ring 21. The far segment 25 is shown in its operative position, wherein its lower edge is contiguous with a fixed cowl segment 33 having straight and inturned portions similar to the portions 26 and 27 of the movable cowl segments. The fixed cowl portion 33 is supported by and screwed to longitudinal channel elements 34 extending from the wall 16 forwardly and being supported at their outboard ends by struts 35 joined to the mounting ring 21. The channels 34 are provided with openings 36 adapted to be engaged by cowl fasteners 37 carried at the lower edges of the cowl segments 25 so that, when both segments 25 are hinged downwardly about the hinge 22 they may be united with the fixed cowl segment 33 by engaging the cowl fasteners with the channels 34. It will be noted that the trailing edges 39 of the segments 25 closely engage the forward portion of the body 15. An exit opening is provided in the rear portion of the fixed cowling segment 33, at 40, through which cooling air, after entering the opening 29 and passing over the engine, may issue. By disposing the air exit opening 40 in only the bottom part of the cowling, which embraces a circumferential arc of not more than 90°, any oil or gasoline vapors picked up by the cooling air currents is discharged downwardly below the fuselage body and thus eliminates the possibility of oil spray covering the entire circumference of the body and entering the crew compartment as sometimes happens in the case of the conventional type of cowling whose air exit opening comprises an annulus co-extensive with the circumference of the cowling.

It will be noted that the several inturned leading edge portions 27 of the cowling are relatively unsupported by the tube 19 or by the channels 34 and, since there is a substantial pressure difference between the exterior and interior of the cowl nose during flight, it is desirable to join the leading edges 28 of the several cowl segments to provide a continuous ring to resist deformation of the leading edge portions of the cowl. Accordingly, I provide hinged lock fittings 42 at the ends of the leading edge portions of the several cowl segments which are engageable with a stud 43 on the adjacent leading edge segment, the fittings 42 being retained in engagement with the studs 43 by safety pins 44 which are similar to pins 24 when the cowl is adjusted for the night condition.

It will now be seen that when the cowling is locked into position by the fasteners 37 and the fittings 42, a unit structure is provided capable of properly resisting the flight forces imposed thereon. Should it be desired to inspect the power plant beneath the cowling, it is merely necessary to unlock the cowling fasteners 37 and the fittings 42, raising the cowl segments 25 upon their hinge 22 whereupon complete accessibility is permitted to the engine and to the accessories normally carried at the rear of the engine and extending through the mounting ring 21. As a further service aid, struts 46 are hinged as at 47 to a portion of the mounting structure 17 and may be engaged with a socket 48 fixed to each cowl segment 25 to hold the cowl segment in an elevated position. When inactive, the strut 46 may be collapsed along that member of the structure 17 to which it is hinged and snapped into a clip 48 prior to lowering and locking of the cowl segment. The near cowl segment is shown with the strut 46 in active position, whereas, the far strut 46 is shown in folded position.

The segments 25 may be bodily removed from the aircraft by removing pins 23 and lifting the segments, with the hinge 22, from the supporting structure. The segment 33 is also removable by detaching the screws which hold it in place.

It will be apparent that the disposition of various parts of the assembly as shown may be altered without effecting the general scope of the invention—for instance, the strut 46 may be hinged to the cowling segment rather than to the mounting structure, the form of cowl fasteners shown may be replaced with locking pins or the like, the channels 34 may be replaced by tubular or other members, and the hinge 22 and its support may be subject to various design modifications. In connection with the overlap of the cowl trailing edges 39 with respect to the body, liners of felt or the like may be interposed in the joint to minimize abrasion.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In an annular cowling system for aircraft power plants, the aircraft including a wall and an engine mounting structure extending forwardly thereof to the forward end of which an engine is adapted to be secured, braces on the wall and structure, longitudinal rails carried by said braces, circumferentially spaced relative to one another, and a plurality of individually structurally integral cowl segments disposed around said braces and detachably carried thereby, whereby the cowl segments are free of contact with and support by such a mounted engine.

2. In an annular cowling system for aircraft power plants, the aircraft including a wall and an engine mounting structure extending forwardly thereof, braces on the wall and structure, longitudinal rails carried by said braces circumferentially spaced relative to one another, a plurality of individually structurally integral cowl segments disposed around said braces and detachably carried thereby, the forward ends of said segments being inturned and overhung from said braces and defining at their forward edges an air entrance opening, and detachable means carried by and connecting adjacent segment leading edge portions to comprise a continuous self supporting leading edge structurally united against displacement of any segment leading edge.

3. In an aircraft power plant annular cowling system, a fore-and-aft rail at the top of the power plant, annular cowling segments hinged to said rail and having inturned leading edge portions extending forwardly of the front end of said rail, rails at the sides of the power plant of similar length to the first rail, means for attaching the outer rearward edges of said segments to respective rails, and detachable means on and at the relatively externally unsupported leading edges of said segments for joining adjacent ends thereof to one another, against relative displacement.

4. In an aircraft power plant, a frame structure, a split annular cowling disposed about the structure and extending forwardly thereof without frame support, means to fasten the cowling to the structure, and means at the ends of unsupported cowling leading edge portions clampable to adjacent ends to prevent displacement of the respective leading edge portions relative to one another and to provide structural integrity for the assembled portions.

5. In a cowl system, a segmental cowl annulus, means supporting the cowl segments along a portion of their axial length, means for detachably fastening the cowl segments to said supporting means, and means for detachably fastening said cowl segments to one another in that portion of their length which extends beyond said supporting means.

6. In an aircraft, a body adapted for the mounting of a static radial cylinder engine at the forward end thereof, an annular cowling adapted to encircle the complete engine and forming a smooth forward continuation of the body and having a front air entrance opening substantially concentric with the cowling, and having an air exit opening at the rearward end of the cowling occupying only a bottom segmental part of the cowling, said annular cowling comprising segments inturned at their leading edges and of substantially cylindrical form rearward thereof, cowling support structure comprising elements of a cylinder secured to the body, to which the cylindrical parts of the segments are detachably secured, the leading edge portions of said segments being relatively unsupported by and being overhung from said structure, and clamp devices at the leading edge corner of each segment engageable with a co-acting corner device of an adjacent segment to lock said leading edges to one another.

7. In aircraft an annular engine cowling comprising a plurality of segmental elements adapted to be joined in edge-to-edge relation, the cowling comprising a rearward substantially straight part and a forward relatively unsupported curved inturned leading edge part defining an air entrance opening, means carried by the aircraft extending along the substantially straight cowling part, to which the several segments are detachably secured, and means for detachably securing the unsupported leading edge segment edges to one another.

8. In aircraft, an annular engine cowling comprising segments, a member carried by the aircraft to which certain of said segments are hinged for movement between their joint annular position and raised positions to provide access to the interior of the cowling, a skeleton structure within the cowling, and a strut hinged thereto movable into engagement with a raised cowl segment to hold same in a raised position.

9. In aircraft, a supporting structure, a plurality of segmental cowl portions detachably secured thereto to comprise an annular cowling, said portions overhanging said structure whereby the overhanging portions are not directly supported, and means at and carried by the end corners of said overhung portions for detachably securing the segmental portions to one-another.

CARL WILLIAM SCOTT.